(12) United States Patent
Varma et al.

(10) Patent No.: US 9,789,667 B2
(45) Date of Patent: Oct. 17, 2017

(54) FIRE RESISTANT GLAZING

(75) Inventors: Karikath Sukumar Varma, Southport (GB); John Richard Holland, Ormskirk (GB); David William Holden, Wigan (GB); Stephen Ian Bond, Warrington (GB)

(73) Assignee: PILKINGTON PLC, St. Helens (GB)

( * ) Notice: Subject to any disclaimer, the term of this patent is extended or adjusted under 35 U.S.C. 154(b) by 218 days.

(21) Appl. No.: 12/552,097

(22) Filed: Sep. 1, 2009

(65) Prior Publication Data

US 2009/0317618 A1    Dec. 24, 2009

Related U.S. Application Data

(62) Division of application No. 10/523,540, filed as application No. PCT/GB03/03434 on Aug. 6, 2003, now abandoned.

(30) Foreign Application Priority Data

Aug. 10, 2002   (GB) .................................. 0218672.4

(51) Int. Cl.
  *B05D 3/02* (2006.01)
  *B32B 17/10* (2006.01)
  *B32B 17/06* (2006.01)

(52) U.S. Cl.
  CPC ...... *B32B 17/10311* (2013.01); *B32B 17/069* (2013.01); *B32B 17/10036* (2013.01)

(58) Field of Classification Search
  CPC ..................................................... B32B 17/06
  USPC ........................................................ 427/376.2
  See application file for complete search history.

(56) References Cited

U.S. PATENT DOCUMENTS 4,190,698 A * 2/1980 De Boel et al. .............. 428/334

FOREIGN PATENT DOCUMENTS

| JP | 4050109 A | | 2/2009 | |
|---|---|---|---|---|
| WO | WO 01/10638 | * | 2/2001 | ............. B32B 17/10 |
| WO | WO 01/70495 | * | 9/2001 | ............. B32B 17/10 |
| WO | WO 02/24445 | * | 3/2002 | ............. B23B 17/10 |

* cited by examiner

*Primary Examiner* — Tabatha Penny
(74) *Attorney, Agent, or Firm* — Marshall & Melhorn, LLC

(57) ABSTRACT

Fire resistant glazings comprise a fire resistant interlayer based upon a silicate waterglass are characterized by the incorporation of aluminum ions. The aluminate is incorporated as a solution which has been partially neutralized using hydroxycarboxylic acid which is preferably citric acid. The incorporation of aluminum provides glazings have improved fire resistance and impact properties.

21 Claims, No Drawings ated at least 2.85:1. Sodium
FIRE RESISTANT GLAZING

RELATED APPLICATIONS

This application is a divisional application of U.S. Ser. No. 10/523,540, filed on Feb. 3, 2005 now abandoned. U.S. Ser. No. 10/523,540 was pending as of the filing date of this application. U.S. Ser. No. 10/523,540 is hereby incorporated by reference as if set forth in its entirety herein.

BACKGROUND OF THE INVENTION

This invention relates to novel solutions useful in the production of fire resistant glazings comprising an alkali metal aluminate and a silicate waterglass, to methods for the preparation of those solutions and to the production of intumescent interlayers from those solutions which may be incorporated into fire resistant glazings.

Glass laminates incorporating an intumescent inorganic silicate layer sandwiched between two opposed panes of glass are sold under the trade marks PYROSTOP and PYRODUR by the Pilkington group of companies. When such laminates are exposed to a fire the inorganic layer intumesces and expands to form a foam. The foam provides a thermally insulating layer which protects the pane of glass remote from the fire so that the structural integrity of the glass unit and thereby a barrier to the propagation of the fire is maintained for a longer period. Glass laminates incorporating such intumescent layers have been used successfully as fire resistant glass structures. These laminates may comprise more than two panes of glass sandwiching more than one intumescent interlayer. Laminates comprising up to eight intumescent layers have been employed. These multi layered laminates are relatively thick and correspondingly expensive.

The intumescent inorganic layer is normally formed from a sodium silicate waterglass or a mixture thereof with a potassium silicate waterglass. The layer is commonly formed by preparing a solution of the waterglass (or waterglasses), spreading that solution on the surface of the glass and drying excess water from the solution so as to form the intumescent inorganic layer.

U.S. Pat. No. 4,190,698 discloses fire resistant glazings comprising an intumescent inorganic layer obtained by drying a waterglass solution. The authors suggest the addition of various additives to the waterglass solution including urea, polyhydric alcohols, monosaccharides, polysaccharides, sodium phosphate, sodium aluminate, borax, boric acid and colloidal silica. There is no specific disclosure of the addition of an aluminate to a waterglass solution.

We have discovered that the addition of sodium aluminate to a waterglass solution as proposed in U.S. Pat. No. 4,190,698 does not produce a solution which is useful in the production of fire resistant glazings. The solutions are unstable and form a precipitate immediately or on standing. Since the dried interlayer must be optically clear the presence of particulate material such as this precipitate is not acceptable.

Applicants have discovered that it is possible to produce a clear stable solution comprising an aluminate and a waterglass which can be used in the production of fire resistant glazings by partially neutralising the aluminate with a hydroxy carboxylic acid prior to mixing it with the waterglass. Thus from one aspect this invention provides a clear stable solution useful in the production of fire resistant glazings comprising an alkali metal silicate waterglass, a water soluble aluminate and a hydroxy caboxylic acid.

The water soluble aluminate is preferably an alkali metal aluminate such as lithium aluminate, potassium aluminate, caesium aluminate and most preferably sodium aluminate. Other water soluble aluminates notably ammonium aluminate and alkyl ammonium aluminates may also be employed.

The carboxylic acid is preferably a hydroxy carboxylic acid and more preferably an α-hydroxy carboxylic acid. Examples of preferred carboxylic acids include tartaric acid, malic acid, gluconic acid, lactic acid, saccharic acid and most preferably citric acid.

The waterglasses useful in the compositions of this invention are preferably sodium silicate waterglasses. The preferred sodium silicate waterglasses are those wherein the weight ratio of $SiO_2:Na_2O$ is at least 2.0:1 more preferably at least 2.5:1 and most preferably at least 2.85:1. Sodium silicate waterglass solutions wherein the weight ratio of $SiO_2:Na_2O$ varies between 2.0:1 and 4.0:1 are available as articles of commerce. Specifically solutions wherein this ratio is 2.0:1, 2.5:1 and 2.85:1 3.0:1 and 3.3:1 are available as articles of commerce. Waterglasses having any particular weight ratio of $SiO_2:Na_2O$ may be produced by blending these commercially available waterglass solutions. Sodium silicate waterglasses having a weight ratio of $SiO_2:Na_2O$ of 2.0:1, 2.5:1 and 2.85:1 are preferred for use in the present invention.

Potassium silicate and lithium silicate waterglasses may also be used in the compositions of this invention. In a preferred embodiment these waterglasses will be used as a partial replacement for the sodium silicate waterglasses. In general the molar ratio of sodium to potassium and/or lithium in the waterglass solution will be at least 2:1.

In particular preferred embodiment the waterglass solution used in the present invention comprise a mixture of sodium silicate waterglass and a potassium silicate waterglass. The molar ratio of sodium ions to potassium ions in these mixtures in preferably at least 4:1. Where a potassium silicate waterglass is employed it is preferably one where the weight ratio $SiO_2:K_2O$ is in the range 1.43:1 to 2.05:1.

The solutions of this invention may further comprise one or more polyhydric compounds which are known to be useful in existing intumescent interlayers. Polyhydric compounds which have been proposed for this use include glycerol, glycerine or a derivative of glycerine or a sugar. The most commonly used polyhydric compound and the preferred polyhydric compound for present use is glycerol.

In order to be useful in the production of intumescent interlayers the solution of this invention should preferably be clear, stable and capable of being dried to form a useful intumescent interlayer. The properties of the solution are affected by the composition of the solution and the methods used in their preparation. The utility of any particular solution may be determined by experiment. The stability of the solutions decreases as the amount of aluminate present increases. However the fire resistance of the interlayer increases in proportion to the amount of aluminate present. The amount of aluminate which is incorporated into the solution will preferably represent a compromise between these two properties and will typically be such that the molar ratio of silicon to aluminium is in the range 20:1 to 35:1 more preferably in the rage 25:1 to 32:1.

A second significant factor which affects the utility of the solutions of this invention is the weight ratio of silica to alkali metal oxide. Increasing the proportion of silica reduces the stability of the solution and is undesirable. The lower ratios of silicon to alkali metal are preferred since this increases the flow point of the dried interlayer which is an important factor influencing the performance of a glazing incorporating such an interlayer in fire testing. Generally we prefer that the weight ratio of silica to alkali metal oxide is in the range 2:1 to 4:1.

The solutions of the present invention must be clear. They are prepared by mixing the various components in a manner which produces a clear stable solution which may then be dried to form a clear stable intumescent layer.

We prefer that the solutions are prepared using a process which comprises as a first step partially neutralising the aluminate with the hydroxy carboxylic acid. This neutralisation may be carried out by adding a hydroxycarboxylic acid solution to an aqueous solution of the aluminate. As the presence of excessive quantities of water may destabilise the silicate solutions of the invention and because in any event excess water is an additional load on the drying process used to form the intumescent interlayer the aluminate solution will preferably contain as high a solids content as is compatible with the production of a clear stable solution. The aluminate solution may typically comprise from 20 to 45% by weight of solids.

The hydroxy carboxylic acid solution may be added to the aluminate either as a solid or as a solution. The solution may be an aqueous solution. In the preferred embodiments where the solutions of this invention comprise a polyhydroxy compound which is preferably glycerol the hydroxy carboxylic acid may be dissolved in the polyhydroxy compound and the resulting solution is used to neutralise the aluminate.

The addition of the acid solution to the aluminate solution is preferably continued until the solution has a pH in the range 9.0 to 11.0 and more preferably in the range 9.5 to 10.0. The neutralisation should be carried out with thorough mixing and in a manner such that the temperature of the reaction mixture is not allowed to rise excessively and is preferably maintained below 50° C.

Solutions which comprise a water soluble aluminate, a hydroxy carboxylic acid and a polyhydric compound which is preferably glycerol are believed to be novel and comprise a further aspect of the invention.

The partially neutralised aluminate solution may be added to a solution comprising an alkali metal silicate waterglass to form a solution according to the present invention. The mixing of the aluminate with the waterglass must be carried out in a controlled manner so as to avoid the formation of any precipitate. We prefer to add the aluminate to the waterglass at a controlled rate with thorough mixing.

The resulting solutions may be used in the production of five resistant glazings using known techniques. In one existing process the solutions may be spread upon the surface of a glass sheet which is provided with an edge barrier which retains the solution on the surface of the glass. The quantity of solution employed will vary with the desired thickness of the dried interlayer. The quantity needed to produce an interlayer of any particular thickness may be determined by routine experiment.

The solution is then dried under carefully controlled conditions of temperature and humidity so as to ensure the production of a clear transparent interlayer which is free from bubbles and other optical imperfections. The dried interlayers generally comprise form 10 to 35% by weight of water. The aluminium content of the dried interlayer is generally in the range 0.1% to 5.0% by weight preferably from 0.1% to 1.0% by weight. We have discovered that the presence of the aluminium improves the performance of glazings into which the interlayer is incorporated in terms of their fire resistance and their mechanical impact resistance properties.

The thickness of the dried interlayer will generally be in the range 0.1 to 2.0 mm preferably from 0.5 to 2.0 mm. The formations of thicker interlayers requires a longer drying time and is thereby disadvantageous. Thinner interlayers can be produced using shorter drying times. A glass laminate having a thicker interlayer may be produced by bringing two sheets of glass each having a relatively thin interlayer having say a thickness of from 0.5 mm to 1.0 mm into face to face contact so as to form a laminate having an intumescent interlayer which is from 0.2 to 2.0 mm thick.

Flat glass sheets of various thickness may be used in the laminates of the present invention. Typically sheets of soda lime float glass having a thickness of from 2.0 mm to 4.0 mm are employed.

The edge barrier is normally cut away at the completion of the drying process to leave a glass sheet having a dried interlayer on one surface. A laminate may be formed by placing a second glass sheet on top of the interlayer. In another embodiment the second glass sheet may itself be one having an intumescent interlayer on one surface thereof. Mounting this second sheet on top of the first sheet so that the two fire resistant interlayers are in contact with each other produces a laminate having a relatively thick interlayer. Mounting the second sheet so that the interlayer is on its upper surface and subsequently providing a third glass sheet on top of that second interlayer produces a laminate having two interlayers mounted between three panes of glass. Laminates having as many as eight interlayers may be produced.

In an alternative process the solutions of this invention may be poured onto the surface of the substrate and dried to form an intumescent fire resistant interlayer which is sufficiently strong to be removed from the substrate in the form of a transparent film. The film may then be placed between two sheets of glass to form a fire resistant glass laminate. A variety of substrates may be employed in processes of this type examples being glass sheets, metal sheets and polymeric materials such as PTFE and polyolefins such as polypropylene.

The invention is illustrated by the following example

EXAMPLE 1

A solution comprising a sodium aluminate, a sodium silicate waterglass, a potassium silicate waterglass and citric acid was made up using the following components:
1 A solution of a sodium silicate waterglass having a weight ration $SiO_2:Na_2O$ of 2.85:1 and comprising 40% by weight of solids, sold by INEOS as Crystal 96.
2 A solution of a potassium silicate waterglass having a weight ration of $SiO_2:K_2O$ of 1.43:1 comprising 52.4% by weight of solids; sold by INEOS as Crystal K120 potassium silicate
3 An aqueous solution of sodium aluminate comprising 38.0% by weight solids sold by Nordisk Aluminate
4 Glycerol—an 87% by weight solution in water
5 Citric acid—reagent grade The solutions were made up as follows:
First 5 parts by weight of citric acid were added to 10 parts by weight of glycerol with stirring so that the citric acid dissolved. The resulting solution is added slowly with vigorous stirring to 89.86 parts by weight of the sodium aluminate solution. The temperature of the solution was maintained below 50° C. throughout the addition. The resulting solution had a pH of 9.5.

A waterglass solution comprising a sodium silicate, a potassium silicate and glycerol was made up by mixing 151.7 parts by weight of Crystal 96 with 44.3 parts by weight of Crystal K120 and 20.5 parts by weight of glycerol.

The mixed solution comprising the aluminate was then added to the waterglass solution. The addition was carried out by slowly adding the aluminate solution with thorough mixing using a Silverson high shear mixer. The resulting solution was clear and was stable on storage at room temperature.

This solution was then applied to the surface of a sheet of float glass having an edge barrier around its perimeter in a quantity of 4 kilograms of solution per square meter of glass. The glass sheet was placed in an oven and dried over a prolonged period in a controlled atmosphere until the water content of the solution had reduced to 26% by weight. A clear interlayer having a depth of approximately 1.3 mm had formed on the surface of the glass.

The edge barrier was cut away and a second sheet of float glass having a thickness of 3 mm was placed on top of the interlayer to produce a glass laminate. Pieces of this laminate were tested for Fire Resistance according to B.S. 476 Part 20/2 and mechanical impact performance according to B.S 6206 Class C. Two pieces were subject to the fire test and both passed with times of 33 minutes and 30 minutes. Four pieces were tested for impact performance and all were rated at least a safe pass.

The invention claimed is:

1. A process for producing a clear intumescent interlayer with from 10 to 35% by weight of water:
   1) in a first step preparing a solution comprising an alkali metal silicate; and
   2) in a second step preparing a partially neutralized aluminate solution comprising:
      i) a water soluble aluminate; and
      ii) a hydroxy carboxylic acid, by:
         a) adding the hydroxy carboxylic acid to the water soluble aluminate in solution with mixing and stirring to partially neutralize the water soluble aluminate and until the partially neutralized aluminate solution has a pH in the range of 9.0 to 11.0; and
         b) maintaining the temperature of the water soluble aluminate solution below 50° C. throughout the addition of the hydroxy carboxylic acid to the water soluble aluminate and throughout the mixing thereof until a pH range of 9.0 to 11.0 is reached, and
   3) in a third step mixing together the partially neutralized aluminate solution and the alkali metal silicate solution to provide a clear stable aqueous solution; and
      wherein the formation of a precipitate during addition of the partially neutralized aluminate solution to the alkali metal silicate is prevented by the addition of the hydroxy carboxylic acid to the water soluble aluminate to partially neutralize the water soluble aluminate.

2. A process according to claim 1 wherein the clear stable aqueous solution is dried to produce the clear intumescent interlayer which comprises from 0.1 to 5.0% by weight of aluminium.

3. A process according to claim 1 wherein the clear intumescent interlayer produced thereby has a thickness of from 0.5 to 2.0 mm.

4. A process according to claim 1, wherein the water soluble aluminate is an alkali metal aluminate.

5. A process according to claim 1, wherein the water soluble aluminate is a sodium aluminate.

6. A process according to claim 1, wherein the hydroxy carboxylic acid is an α-hydroxy carboxylic acid.

7. A process according to claim 1, wherein the hydroxy carboxylic acid is selected from the group consisting of: tartaric acid, malic acid, gluconic acid, lactic acid, saccharic acid and citric acid.

8. A process according to claim 7, wherein the hydroxy carboxylic acid is citric acid.

9. A process according to claim 1, wherein the alkali metal silicate solution comprises a weight ratio $SiO_2:M_2O$ of from 2.0:1 to 4.0:1 where M represents an alkali metal cation.

10. A process according to claim 9, wherein the alkali metal silicate solution comprises a sodium silicate waterglass which comprises a weight ratio $SiO_2:Na_2O$ of from 2.5:1 to 3.0:1.

11. A process according to claim 9, wherein the alkali metal silicate solution comprises a potassium silicate waterglass.

12. A process according to claim 11, wherein the potassium silicate waterglass used in the production thereof has a weight ratio $SiO_2:K_2O$ of from 1.43:1 to 2.05:1.

13. A process according to claim 9, wherein the alkali metal silicate solution comprises both potassium silicate and sodium silicate, wherein the molar ratio of sodium ions to potassium ions is at least 2:1.

14. A process according to claim 1, wherein, the molar ratio of silicon to aluminum for the clear aqueous solution, is in the range 20:1 to 35:1.

15. A process according to claim 1, wherein, the molar ratio of silicon to aluminum for the clear aqueous solution, is in the range 25:1 to 32:1.

16. A process according to claim 15 wherein, within the clear aqueous solution, the weight ratio of silica to alkali metal oxide is in the range 2:1 to 4:1.

17. A process according to claim 1, wherein the clear aqueous solution further comprises a polyhydric compound.

18. The process according to claim 17, wherein the polyhydric compound is glycerol.

19. A process according to claim 1, wherein the partially neutralized aluminate solution comprises from 20 to 45% by weight of solids.

20. A process according to claim 1, wherein the hydroxy carboxylic acid is added to the water soluble aluminate solution until the pH of the partially neutralized aluminate solution is in the range of 9.5 to 10.0.

21. A process for producing a clear intumescent interlayer including an alkali metal silicate, a partially neutralized aluminate, and a hydroxy carboxylic acid, comprising the steps of:
   i) providing a partially neutralized aluminate solution; and
   ii) providing an alkali metal silicate solution; and
   iii) mixing the alkali metal silicate solution and the partially neutralized aluminate solution together; and
   iv) before mixing the alkali metal silicate solution and the partially neutralized aluminate solution together, adding the hydroxy carboxylic acid to a water soluble aluminate solution with mixing until the water soluble aluminate solution is partially neutralized and has a pH in the range of 9.0 to 11.0, resulting in the partially neutralized aluminate solution; and
   v) maintaining the temperature of the water soluble aluminate solution both during the addition of the hydroxy carboxylic acid to the water soluble aluminate solution and throughout the mixing of the water soluble aluminate solution and the hydroxy carboxylic acid below 50° C.; and vi) only after the partially neutralized aluminate solution has a pH in the range of 9.0 to 11.0, mixing the partially neutralized aluminate solution with the alkali metal silicate waterglass to form a clear, stable aqueous solution comprising the alkali metal silicate solution, the partially neutralized aluminate, and the hydroxy carboxylic acid; and vii) drying excess water from the stable aqueous solution comprising the alkali metal silicate solution, the partially neutralized aluminate, and the hydroxy carboxylic acid to form an intumescent inorganic layer comprising from 10 to 35% by weight of water.

\* \* \* \* \*